(12) United States Patent
Sugiyama

(10) Patent No.: US 11,455,174 B2
(45) Date of Patent: Sep. 27, 2022

(54) ELECTRONIC APPARATUS, CONTROL METHOD, AND RECORDING MEDIUM WITH PROGRAM RECORDED THEREON

(71) Applicant: SHARP KABUSHIKI KAISHA, Sakai (JP)

(72) Inventor: Koichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/395,897

(22) Filed: Aug. 6, 2021

(65) Prior Publication Data

US 2022/0050691 A1  Feb. 17, 2022

(30) Foreign Application Priority Data

Aug. 11, 2020 (JP) .............................. JP2020-135774

(51) Int. Cl.
*G06F 9/44* (2018.01)
*G06F 9/445* (2018.01)
(52) U.S. Cl.
CPC ................................. *G06F 9/44505* (2013.01)
(58) Field of Classification Search
CPC ...................................... G06F 1/32; G06F 9/44
See application file for complete search history.

(56) References Cited

U.S. PATENT DOCUMENTS

| 10,263,868 B1* | 4/2019 | Baldi | .................... H04W 12/02 |
| 2004/0078617 A1* | 4/2004 | Moser | .................... G06F 9/542 |
|  |  |  | 714/3 |
| 2015/0268970 A1* | 9/2015 | Mudusuru | ............. G06F 9/4411 |
|  |  |  | 713/1 |

FOREIGN PATENT DOCUMENTS

JP          2013-178739 A       9/2013

* cited by examiner

*Primary Examiner* — Keshab R Pandey
(74) *Attorney, Agent, or Firm* — ScienBiziP, P.C.

(57) ABSTRACT

An electronic apparatus includes a first communicator that performs communication with a computer body based on a first communications standard, a second communicator that performs communication with the computer body based on a second communications standard, a determination processor that classifies and determines a category of an operating system based on a first communications parameter acquired from the first communicator, a setting processor that sets an operation mode corresponding to the category of the operating system as determined by the determination processor, and a controller that controls, based on the communication with the computer body performed by the second communicator, a specified function according to the operation mode set by the setting processor.

13 Claims, 6 Drawing Sheets

| TTL | OS CATEGORY |
|---|---|
| 62~64 | Linux/Mac/Android |
| 126~128 | Windows |
| 253~255 | others |

| OPERATION MODE | OS CATEGORY |
|---|---|
| NORMAL MODE | Windows/Android6~ |
| TOUCH DEDICATED MODE | Linux/Android~5 |
| PEN DEDICATED MODE | MacOS 10.15 |
| MOUSE MODE | MacOS ~10.14/others |

ELECTRONIC APPARATUS, CONTROL METHOD, AND RECORDING MEDIUM WITH PROGRAM RECORDED THEREON

INCORPORATION BY REFERENCE

This application is based upon and claims the benefit of priority from the corresponding Japanese Patent Application No. 2020-135774 filed on Aug. 11, 2020, the entire contents of which are incorporated herein by reference.

BACKGROUND

The present disclosure relates to an electronic apparatus, a control method, and a recording medium, on which a program is recorded.

Conventionally, electronic apparatuses are provided that are connected to a computer body through a cable, wireless communications or the like for use. Such electronic apparatuses include an input apparatus such as a keyboard, a mouse, a game controller, and a touch panel apparatus, an output apparatus such as a display, a projector, a headphone, a speaker, and a printer, and a network apparatus such as a router.

If a computer, in which a specified operating system (OS) is installed, is connected to the electronic apparatus as above so as to use functions of the electronic apparatus, a problem arises in that part or the whole of the functions of the electronic apparatus cannot be used depending on the category, to which the operating system belongs. Taking a touch panel apparatus as an example, a problem arises in that a touch pen (pen digitizer) cannot be used or does not normally operate under an operating system, Android (registered trademark) or Linux (registered trademark), in an earlier version. A problem also arises in that a touch pen cannot be used under Ubuntu (registered trademark) in version 17.10 to 18.04 or Mac OS (registered trademark) in version 10.15.

Thus, in an electronic apparatus connected to a computer body for use, an available function varies with the category of an operating system. For this reason, a user needs to personally set an operation mode corresponding to an available function on the electronic apparatus, which is inconvenient for the user.

An apparatus that estimates information on a plurality of terminals each sending a query including an inquiry name to a domain name system (DNS) server over a network is well-known. Such known apparatus includes an inquiry name registration means that previously registers the category of software installed in the terminals for each inquiry name, a query collection means that collects and accumulates queries sent from the terminals, and a software category identification means that extracts the inquiry name from each accumulated query and uses the inquiry name registration means to identify the category of software corresponding to the relevant query. The apparatus presupposes that the category of software installed in a plurality of terminals is previously registered for each inquiry name, and is, accordingly, not applicable to a terminal without the registration nor adequately convenient.

SUMMARY

An object of the present disclosure is to provide an electronic apparatus connectable to a computer body for use that allows an easy setting of an operation mode corresponding to a function of the electronic apparatus that corresponds to an operating system in the computer body, a control method for such an electronic apparatus, and a recording medium, on which a program for such an electronic apparatus is recorded.

An electronic apparatus according to an aspect of the present disclosure is an electronic apparatus connectable to a computer body, in which a specified operating system is installed, and usable for communications and exertion of a specified function. The electronic apparatus includes a first communicator that performs communication with the computer body based on a first communications standard, a second communicator that performs communication with the computer body based on a second communications standard, a determination processor that classifies and determines a category of the specified operating system based on a first communications parameter acquired from the first communicator, a setting processor that sets an operation mode corresponding to the category of the specified operating system as determined by the determination processor, and a controller that controls, based on the communication with the computer body performed by the second communicator, the specified function according to the operation mode set by the setting processor.

A control method according to another aspect of the present disclosure is a control method for an electronic apparatus connectable to a computer body, in which a specified operating system is installed, and usable for communications and exertion of a specified function, which apparatus includes a first communicator that performs communication with the computer body based on a first communications standard and a second communicator that performs communication with the computer body based on a second communications standard. The control method includes causing one or more processors to implement determining to classify and determine a category of the specified operating system based on a first communications parameter acquired from the first communicator, setting to set an operation mode corresponding to the category of the specified operating system as determined by the determining, and controlling to control, based on the communication with the computer body performed by the second communicator, the specified function according to the operation mode set by the setting.

A recording medium according to yet another aspect of the present disclosure is a non-transitory computer readable recording medium, on which a program for controlling an electronic apparatus connectable to a computer body, in which a specified operating system is installed, and usable for communications and exertion of a specified function, which apparatus includes a first communicator that performs communication with the computer body based on a first communications standard and a second communicator that performs communication with the computer body based on a second communications standard, is recorded. The program causes one or more processors to implement a determination step to classify and determine a category of the specified operating system based on a first communications parameter acquired from the first communicator, a setting step to set an operation mode corresponding to the category of the specified operating system as determined by the determination step, and a control step to control, based on the communication with the computer body performed by the second communicator, the specified function according to the operation mode set by the setting step.

According to the present disclosure, it is possible to provide an electronic apparatus connectable to a computer body for use that allows an easy setting of an operation mode corresponding to a function of the electronic apparatus that corresponds to an operating system in the computer body, a control method for such an electronic apparatus, and a recording medium, on which a program for such an electronic apparatus is recorded.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a diagram illustrating an example of operating system (OS) category information used in a computer system according to an embodiment of the present disclosure.

FIG. 3 is a diagram illustrating an example of operation mode information used in a computer system according to an embodiment of the present disclosure.

DETAILED DESCRIPTION

In the following, embodiments of the present disclosure are described with reference to the accompanying drawings. The embodiments described below are each a concrete example of the present disclosure, and any of the embodiments is not of a nature limiting the technical scope of the present disclosure.

An electronic apparatus according to the present disclosure is connected to a computer body, in which a specified operating system is installed, and used for communications and exertion of a specified function. The electronic apparatus is connected to the computer body through a cable, a wireless system or the like for use. The electronic apparatus is exemplified by such an input apparatus as a keyboard, a mouse, a game controller, and a touch panel apparatus, such an output apparatus as a display, a projector, a headphone, a speaker, and a printer, and such a network apparatus as a router. In the following embodiments, description is made taking a touch panel apparatus as an example of the electronic apparatus.

In the present disclosure, a specified operating system (OS) is installed in a computer body and the computer body fulfills a function of the electronic apparatus under the OS as installed. The OS is classified among a plurality of categories, such as Windows, Mac, Android, and Linux (each being a registered trademark). Each of such OSs includes a plurality of OSs varying with version.

If a Windows OS is installed in the computer body, the touch panel apparatus exerts a function in an operation mode allowing acceptance of a touch input with a finger of a user and a touch input with a touch pen. If a Mac OS is installed in the computer body, the touch panel apparatus exerts a function in an operation mode allowing acceptance of the touch input with a touch pen.

Thus, in the touch panel apparatus, an available function varies with the category of the OS. The embodiments each have a configuration allowing an easy setting of an operation mode corresponding to a function of the touch panel apparatus that corresponds to the category of the OS. The following description is made on a specific configuration of the present disclosure.

Embodiment 1

Computer Body 20

Figure 1:
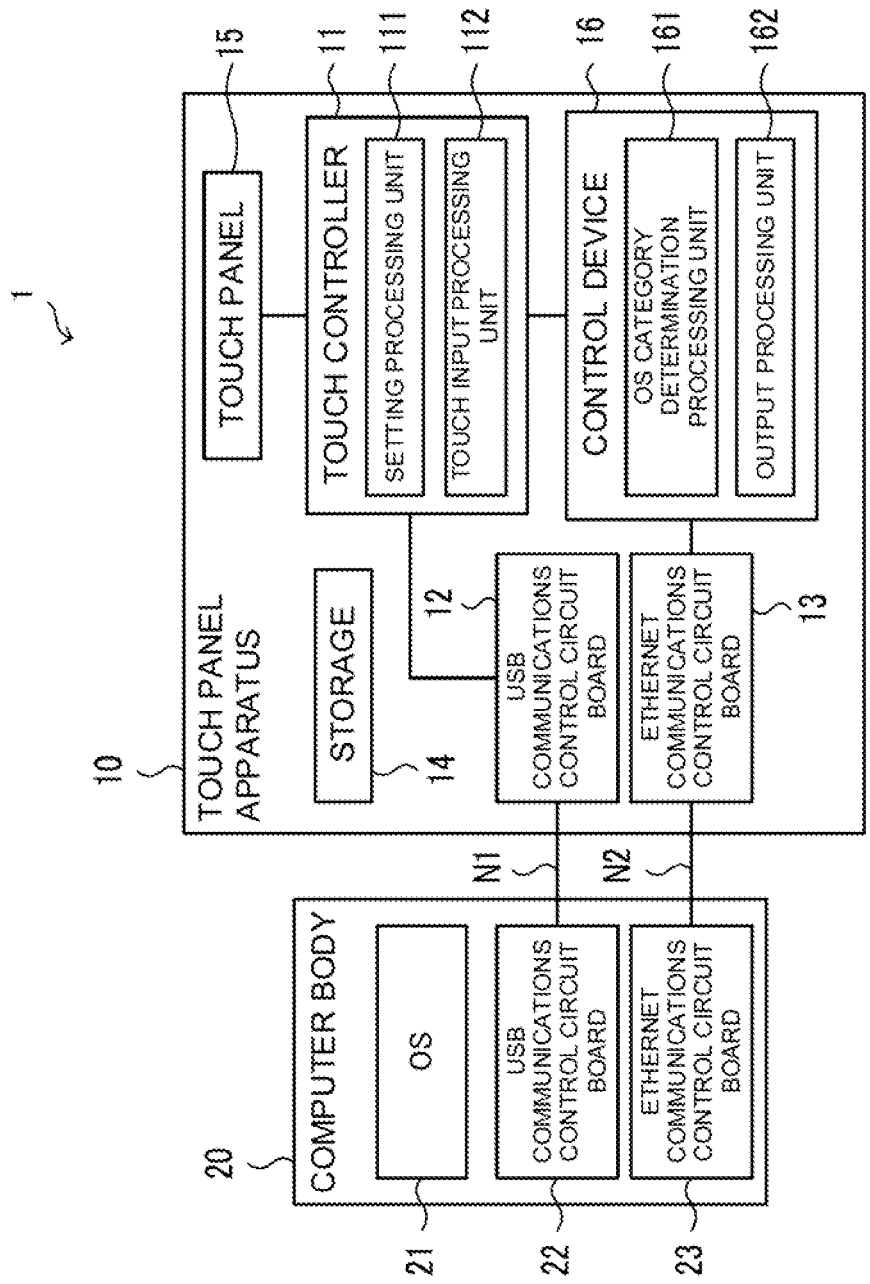
FIG. 1 is a functional block diagram illustrating a configuration of a computer system according to Embodiment 1 of the present disclosure.

FIG. 1 is a diagram illustrating a configuration of a computer system 1 according to Embodiment 1. The computer system 1 includes a computer body 20 and a touch panel apparatus 10. The computer body 20 and the touch panel apparatus 10 are connected to each other through a cable or the like in a manner allowing data communications.

The computer body 20 includes an operating system (OS) 21, a universal serial bus (USB) communications control circuit board 22, and an Ethernet communications control circuit board 23.

The OS 21 is a specified operating system that is previously installed in the computer body 20.

The USB communications control circuit board 22 is a communications interface for achieving data communication of the computer body 20 with the touch panel apparatus 10 in accordance with a USB communications standard (an example of a second communications standard in the present disclosure). According to the USB communications standard, a human interface device (HID) protocol, for instance, is employed for data communications.

The Ethernet communications control circuit board 23 is a communications interface for achieving data communication of the computer body 20 with the touch panel apparatus 10 in accordance with an Ethernet communications standard (an example of a first communications standard in the present disclosure). According to the Ethernet communications standard, a transmission control protocol/internet protocol (TCP/IP protocol), for instance, is employed for data communications.

Touch Panel Apparatus 10

The touch panel apparatus 10 includes a touch controller 11, a USB communications control circuit board 12, an Ethernet communications control circuit board 13, a storage 14, a touch panel 15, and a control device 16.

The USB communications control circuit board 12 is a communications interface for achieving data communication of the touch panel apparatus 10 with the computer body 20 in accordance with the USB communications standard (an example of the second communications standard in the present disclosure). According to the USB communications standard, the HID protocol, for instance, is employed for data communications. The USB communications control circuit board 12 of the touch panel apparatus 10 and the USB communications control circuit board 22 of the computer body 20 are connected to each other through a cable N1. The USB communications control circuit board 12 is an example of a second communicator in the present disclosure.

The Ethernet communications control circuit board 13 is a communications interface for achieving data communication of the touch panel apparatus 10 with the computer body 20 in accordance with the Ethernet communications standard (an example of the first communications standard in the present disclosure). According to the Ethernet communications standard, the TCP/IP protocol, for instance, is employed for data communications. The Ethernet communications control circuit board 13 of the touch panel apparatus 10 and the Ethernet communications control circuit board 23 of the computer body 20 are connected to each other through a cable N2. The Ethernet communications control circuit board 13 is an example of a first communicator in the present disclosure.

The touch panel 15 is a touch panel provided with a display panel and is capable of accepting a touch input with a finger of a user or a touch pen, and the like to an input face of the touch panel 15. The touch panel 15 may be an infrared touch panel, a capacitive touch panel, or a pressure sensitive touch panel. The touch panel 15 may be arranged on a front face of the display panel or within the display panel.

The storage 14 is a non-volatile storage, such as a hard disk drive (HDD) and a solid state drive (SSD), that stores various kinds of information. Specifically, the storage 14 incorporates such data as OS category information D1 and operation mode information D2. FIG. 2 is a diagram illustrating an example of the OS category information D1, and FIG. 3 is a diagram illustrating an example of the operation mode information D2.

The OS category information D1 is information according to the category of an operating system. For instance, a "time to live (TTL) value" as a communications parameter and the category of the OS 21 are made to correspond to each other and registered as the OS category information D1 in FIG. 2. The TTL value refers to a timer value included in a packet transmitted during the local area network (LAN) connection between terminals and is an index of the stability of a communications path. The TTL value is reduced by one each time a packet goes through a repeater on a communications path, and the packet is cancelled (made untransmissible) when the TTL value becomes "0". The TTL value varies with the category of the OS 21, so that it is possible to roughly classify, based on the TTL value, the OS 21 among three categories, "Linux/Mac/Android", "Windows", and "others" (in a first class), as illustrated in FIG. 2. The TTL value is an example of a first communications parameter in the present disclosure.

The operation mode information D2 is information about an operation mode available in the touch panel apparatus 10. In FIG. 3, each of a plurality of operation modes and an OS category making the relevant operation mode available are made to correspond to each other and registered as the operation mode information D2. The operation modes include a "normal mode", a "touch dedicated mode", a "pen dedicated mode", and a "mouse mode". The normal mode refers to an operation mode allowing the acceptance of a touch input with a finger of a user and a touch input with a touch pen. The touch dedicated mode refers to an operation mode only allowing the acceptance of a touch input with a finger of a user. The pen dedicated mode refers to an operation mode only allowing the acceptance of a touch input with a touch pen. The mouse mode refers to an operation mode only allowing the acceptance of an input through the operation of a mouse by a user. To each operation mode, one or more OS categories are made to correspond.

The operation mode in the present disclosure includes at least two operation modes among the "pen dedicated mode" (a first operation mode), in which an input with a touch pen is detectable, the "touch dedicated mode" (a second operation mode), in which an input with a finger of a user is detectable, and the "normal mode" (a third operation mode), in which the input with a touch pen and the input with a finger are detectable.

In another embodiment, part or the whole of such information as the OS category information D1 and the operation mode information D2 may be stored in the computer body 20 or a server accessible from the touch panel apparatus 10. In that case, the touch panel apparatus 10 may acquire the information from the computer body 20 or the server so as to perform various kinds of processing including operation control processing (see FIG. 4) to be described later.

In the storage 14, a control program such as an operation control program for causing the touch controller 11 and the control device 16 to perform the operation control processing (see FIG. 4) to be described later is stored. As an example, the operation control program is non-transitorily recorded on a computer readable recording medium, such as a USB memory, a compact disc (CD) or a digital versatile disk (DVD), read by a reading device (not illustrated), such as a USB drive, a CD drive or a DVD drive, that is electrically connected to the touch panel apparatus 10, and stored in the storage 14. The operation control program may be downloaded from a server accessible from the touch panel apparatus 10 and stored in the storage 14.

The touch controller 11 and the control device 16 include control equipment including a central processing unit (CPU), a read-only memory (ROM), and a random access memory (RAM). The CPU is a processor that performs various kinds of arithmetic processing. The ROM is the non-volatile storage, in which a control program for causing the CPU to perform various kinds of arithmetic processing, such as a basic input/output system (BIOS) and an OS, is stored in advance. The RAM is a volatile or non-volatile storage for storing various kinds of information and is used as a transitory storage memory (working region) for various kinds of processing to be performed by the CPU. The touch controller 11 and the control device 16 execute various control programs previously stored in the ROM or the storage 14 on the CPU so as to control the touch panel apparatus 10. The touch controller 11 and the control device 16 can be understood to constitute a single controller for generally controlling the touch panel apparatus 10.

The control device 16 includes an OS category determination processing unit 161 and an output processing unit 162.

The OS category determination processing unit 161 determines the category of the OS 21 installed in the computer body 20. Specifically, the OS category determination processing unit 161 classifies, as the first class, and determines the category of the OS 21 based on a specified communications parameter acquired from the Ethernet communications control circuit board 13. If acquiring a TTL value from the Ethernet communications control circuit board 13, for instance, the OS category determination processing unit 161 refers to the OS category information D1 in FIG. 2 so as to determine a category of the OS 21 that corresponds to the TTL value.

If a power source of the computer system 1 is turned on, the control device 16 detects a connection destination terminal by a ping command based on LAN communications (TCP/IP protocol communications) between the Ethernet communications control circuit board 23 of the computer body 20 and the Ethernet communications control circuit board 13 of the touch panel apparatus 10. Specifically, the control device 16 performs a ping command in a TCP/IP protocol and receives an echo response message from the computer body 20. The control device 16 acquires the TTL value, which is included in the echo response message, refers to the OS category information D1 in FIG. 2, and determines a category of the OS 21 that corresponds to the TTL value.

If the TTL value is "62 to 64", the OS category determination processing unit 161 determines that the OS 21 in the computer body 20 is "Linux/Mac/Android", that is to say, is Linux, Mac or Android. If the TTL value is "126 to 128", the OS category determination processing unit 161 determines that the OS 21 in the computer body 20 is "Windows". If the TTL value is "253 to 255", the OS category determination processing unit 161 determines that the OS 21 in the computer body 20 is "others", that is to say, is any other OS.

If the TTL value is "62 to 64", moreover, the OS category determination processing unit 161 further classifies, as a second class, and determines the category of the OS 21 based on a communications parameter acquired from the USB communications control circuit board 12. For instance, the OS category determination processing unit 161 determines whether the OS 21 is "Mac" or "Android", based on "Set Feature Report" and "Device Mode" as a control parameter for controlling the operation mode (touch mode) of the touch panel 15. To be specific: The OS category determination processing unit 161 determines that the OS 21 is "Mac OS in version 10.15" if "Set Feature Report" is not included in the control parameter. The OS category determination processing unit 161 determines that the OS 21 is "Android" if "Set Feature Report" is included in the control parameter and "Device Mode" is a "multi-touch mode". The OS category determination processing unit 161 determines that the OS 21 is "Mac OS in version 10.14 or an earlier version" if "Set Feature Report" is included in the control parameter and "Device Mode" is not the "multi-touch mode".

Thus, the OS category determination processing unit 161 classifies, as the first class, and determines the category of the OS 21 based on the first communications parameter (TTL value) acquired from the Ethernet communications control circuit board 13 (a first determination process) and then further classifies, as the second class, and determines the category of the OS 21 based on a second communications parameter ("Set Feature Report" and "Device Mode") acquired from the USB communications control circuit board 12 (a second determination process). "Set Feature Report" and "Device Mode" are an example of the second communications parameter in the present disclosure.

The first class includes categories of the OS 21 according to the TTL value, such as "Linux/Mac/Android", "Windows", and "others". The second class includes categories of the OS 21 according to the control parameter ("Set Feature Report" and "Device Mode"), such as "Android", "Mac OS in version 10.15", and "Mac OS in version 10.14 or an earlier version".

The output processing unit 162 outputs the result of determination by the OS category determination processing unit 161 to the touch controller 11. Specifically, the output processing unit 162 outputs information on the determined category of the OS 21 to the touch controller 11.

The touch controller 11 includes a setting processor 111 and a touch input processing unit 112. The touch controller 11 uses data communications in accordance with the USB communications standard through the USB communications control circuit board 12 to control an operation of the touch panel 15 based on the OS 21 in the computer body 20. Specifically, the touch controller 11 controls a specified function (touch detecting function) according to an operation mode set by the setting processor 111, based on the communication with the computer body 20 performed by the USB communications control circuit board 12. The touch controller 11 is an example of a controller in the present disclosure.

The setting processor 111 sets up the operation mode of the touch panel 15. Specifically, the setting processor 111 sets an operation mode corresponding to the category of the OS 21, which has been determined by the OS category determination processing unit 161, as the operation mode of the touch panel 15.

If the category of the OS 21 as determined by the OS category determination processing unit 161 is "Windows", the setting processor 111 refers to the operation mode information D2 in FIG. 3 so as to specify the "normal mode" corresponding to "Windows" and set the specified "normal mode" as the operation mode of the touch panel 15. If the category of the OS 21 as determined by the OS category determination processing unit 161 is "Android in version 5 or an earlier version", the setting processor 111 refers to the operation mode information D2 in FIG. 3 so as to specify the "touch dedicated mode" corresponding to "Android in version 5 or an earlier version" and set the specified "touch dedicated mode" as the operation mode of the touch panel 15. If the category of the OS 21 as determined by the OS category determination processing unit 161 is "Mac OS in version 10.15", the setting processor 111 refers to the operation mode information D2 in FIG. 3 so as to specify the "pen dedicated mode" corresponding to "Mac OS in version 10.15" and set the specified "pen dedicated mode" as the operation mode of the touch panel 15. If the category of the OS 21 as determined by the OS category determination processing unit 161 is "Mac OS in version 10.14 or an earlier version", the setting processor 111 refers to the operation mode information D2 in FIG. 3 so as to specify the "mouse mode" corresponding to "Mac OS in version 10.14 or an earlier version" and set the specified "mouse mode" as the operation mode of the touch panel 15.

The touch input processing unit 112 controls a function of the touch panel 15 according to an operation mode set by the setting processor 111. Specifically, the touch input processing unit 112 detects an input position (position coordinates) on the input face of the touch panel 15, to which face a touch input has been made with a finger of a user, a touch pen or the like. To be more specific, the touch input processing unit 112 detects the position, where a touch pen, for instance, was brought into contact with the touch panel 15, as the position coordinates on the input face, to which an input has been made with the touch pen.

If the operation mode of the touch panel 15 is set to the "normal mode", the touch input processing unit 112 detects the touch input with a finger of a user and the touch input with a touch pen. If the operation mode is set to the "touch dedicated mode", the touch input processing unit 112 only detects the touch input with a finger of a user. If the operation mode is set to the "pen dedicated mode", the touch input processing unit 112 only detects the touch input with a touch pen. If the operation mode is set to the "mouse mode", the touch input processing unit 112 only detects the input through the operation of a mouse by a user.

The touch input processing unit 112 transmits information on the detected position coordinates of a touch input to the computer body 20 by the data communications in accordance with the USB communications standard through the USB communications control circuit board 12.

Operation Control Processing

Figure 4:
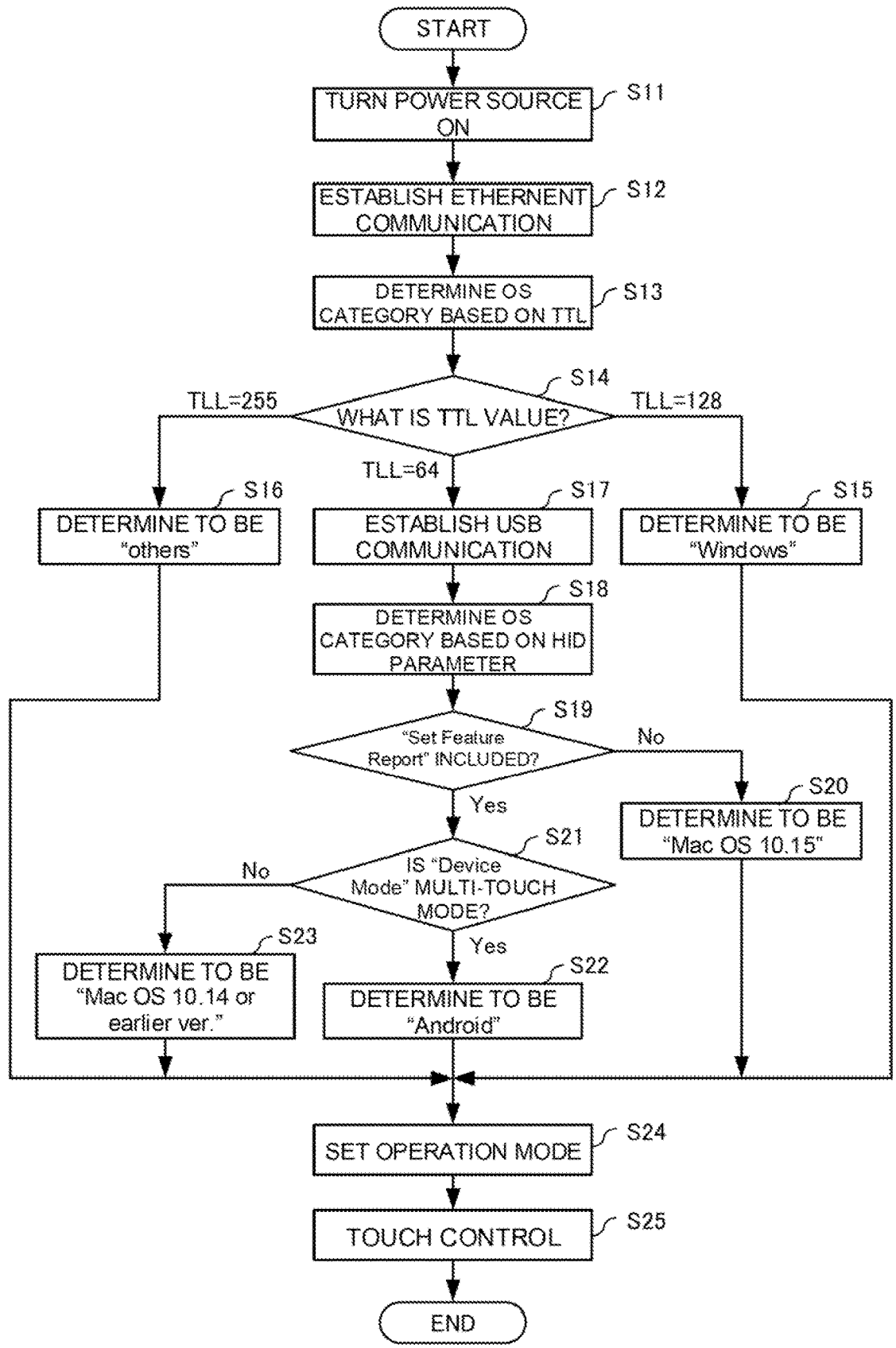
FIG. 4 is a flowchart illustrating an example of a procedure of operation control processing performed in the computer system according to Embodiment 1 of the present disclosure.

Referring to FIG. 4, operation control processing performed by the touch controller 11 and the control device 16 of the touch panel apparatus 10 according to Embodiment 1 is described below. The touch controller 11 and the control device 16 can be understood to constitute a single controller for generally controlling the touch panel apparatus 10. The following description is made on operation control processing performed by such controller.

The present disclosure can be understood to be a disclosure about an operation control method (a control method in the present disclosure) for performing one or more steps included in the operation control processing, and one or more steps included in the operation control processing to be described below may be omitted as appropriate. The steps in the operation control processing may be performed in a different order as long as similar effects are achieved. In the present embodiment, description is made taking the case, where the steps in the operation control processing are performed by the above controller, as an example, while the operation control method, in which the steps in the operation control processing are separately performed by a plurality of processors, is also thinkable as another embodiment.

If the power source of the computer system 1 is initially turned on (step S11), the controller establishes the data communication of the touch panel apparatus 10 with the computer body 20 in accordance with the Ethernet communications standard (step S12).

Next in step S13, the controller (the OS category determination processing unit 161) determines the category of the OS 21 installed in the computer body 20. Specifically, the controller performs the first determination process for classifying, as the first class, and determining the category of the OS 21 based on the TTL value acquired from the Ethernet communications control circuit board 13. For instance, the controller acquires a TTL value from the Ethernet communications control circuit board 13, refers to the OS category information D1 in FIG. 2, and determines a category of the OS 21 that corresponds to the TTL value. Step S13 is an example of a determination step in the present disclosure.

If the TTL value is "126 to 128", the controller determines that the OS 21 is "Windows" (step S15). If the TTL value is "253 to 255", the controller determines that the OS 21 is "others", that is to say, is any other OS (step S16). After steps S15 and S16, the processing proceeds to step S24.

If the TTL value is "62 to 64", the controller determines that the OS 21 is "Linux/Mac/Android", that is to say, is Linux, Mac or Android, and the processing proceeds to step S17.

In step S17, the controller establishes the data communication of the touch panel apparatus 10 with the computer body 20 in accordance with the USB communications standard.

Next in step S18, the controller (the OS category determination processing unit 161) performs the second determination process for classifying, as the second class, and determining the category of the OS 21 based on the communications parameter acquired from the USB communications control circuit board 12. For instance, the controller determines whether the OS 21 is "Mac" or "Android", based on "Set Feature Report" and "Device Mode" as the control parameter for controlling the operation mode of the touch panel 15. Step S18 is an example of the determination step in the present disclosure.

In step S19, the controller determines whether "Set Feature Report" is included in the control parameter. If "Set Feature Report" is not included in the control parameter (NO in step S19), the controller determines that the OS 21 is "Mac OS in version 10.15" (step S20). If "Set Feature Report" is included in the control parameter (YES in step S19), the processing proceeds to step S21.

In step S21, the controller determines whether "Device Mode" is the "multi-touch mode". If "Device Mode" is the "multi-touch mode" (YES in step S21), the controller determines that the OS 21 is "Android" (step S22). If "Device Mode" is not the "multi-touch mode" (NO in step S21), the controller determines that the OS 21 is "Mac OS in version 10.14 or an earlier version" (step S23). After the steps S20, S22, and S23, the processing proceeds to step S24.

In step S24, the controller (the setting processor 111) sets up the operation mode of the touch panel 15. Specifically, the controller refers to the operation mode information D2 in FIG. 3 and sets an operation mode corresponding to the determined category of the OS 21 as the operation mode of the touch panel 15. Step S24 is an example of a setting step in the present disclosure.

Next in step S25, the controller (the touch input processing unit 112) controls the function of the touch panel 15 according to the set operation mode. Specifically, the controller detects the position coordinates of a touch input according to the set operation mode and transmits the position information as detected to the computer body 20. Step S25 is an example of a control step in the present disclosure. The operation control processing is thus performed.

As described above, the touch panel apparatus 10 according to Embodiment 1 is connected to the computer body 20, in which a specified OS is installed, and thereby performs communication and exerts a function to detect a touch input. The touch panel apparatus 10 includes the Ethernet communications control circuit board 13, which performs communication with the computer body 20 based on the Ethernet communications standard, and the USB communications control circuit board 12, which performs communication with the computer body 20 based on the USB communications standard. The touch panel apparatus 10 classifies and determines the category of the OS 21 based on the first communications parameter (TTL value) acquired from the Ethernet communications control circuit board 13 and sets an operation mode corresponding to the determined category of the OS 21. The touch panel apparatus 10 classifies and determines the category of the OS 21 based on the second communications parameter ("Set Feature Report" and "Device Mode") acquired from the USB communications control circuit board 12, and sets an operation mode corresponding to the determined category of the OS 21. The touch panel apparatus 10 performs a process for detecting a touch input according to the set operation mode, based on the communication with the computer body 20 performed by the USB communications control circuit board 12.

The configuration as above makes it possible to easily set, in the touch panel apparatus 10 connected to the computer body 20 for use, an operation mode corresponding to the function of the touch panel apparatus 10, which corresponds to the OS 21 in the computer body 20. As a result, a user does not need to personally set an operation mode corresponding to an available function on the touch panel apparatus 10, so that the convenience is improved.

Embodiment 2

Figure 5:
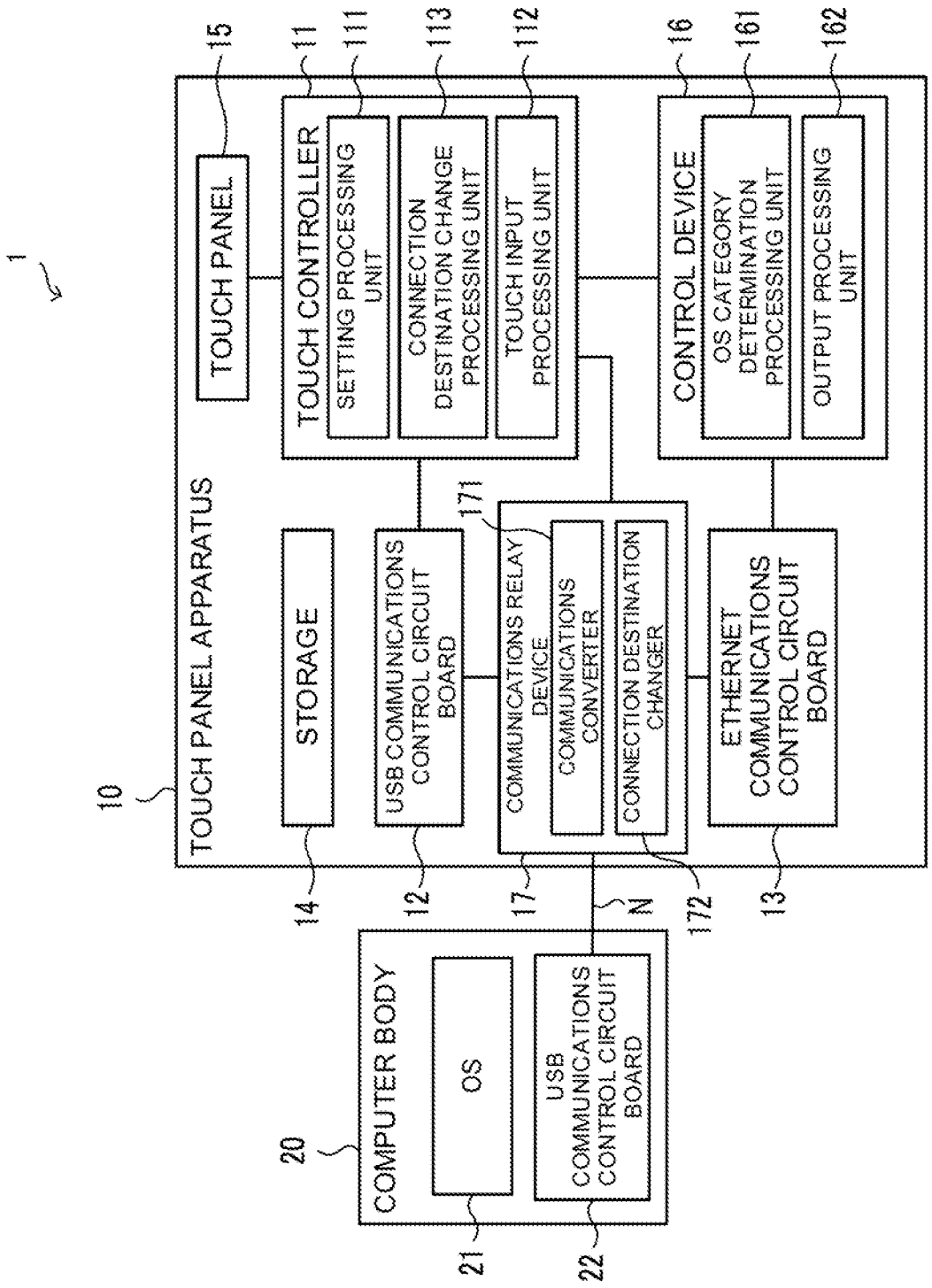
FIG. 5 is a functional block diagram illustrating a configuration of a computer system according to Embodiment 2 of the present disclosure.

FIG. 5 is a diagram illustrating a configuration of a computer system 1 according to Embodiment 2. In the following, the same components as the components of the computer system 1 according to Embodiment 1 are given the same reference signs and description on such components is omitted.

A computer body 20 includes an OS 21 and a USB communications control circuit board 22. In other words, the Ethernet communications control circuit board 23 (see FIG. 1) is omitted from the computer body 20 in Embodiment 2.

A touch panel apparatus 10 includes a touch controller 11, a USB communications control circuit board 12, an Ethernet communications control circuit board 13, a storage 14, a touch panel 15, a control device 16, and a communications relay device 17. In other words, the touch panel apparatus 10 in Embodiment 2 is the touch panel apparatus 10 in Embodiment 1, to which the communications relay device 17 is added.

The communications relay device 17 includes a communication converter 171 and a connection destination changer 172. The communications relay device 17 is so arranged between the USB communications control circuit board 22 of the computer body 20 and the USB communications control circuit board 12 and the Ethernet communications control circuit board 13 of the touch panel apparatus 10 as to relay communications between the computer body 20 and the touch panel apparatus 10. The communications relay device 17 and the USB communications control circuit board 22 of the computer body 20 are connected to each other through a cable N.

The connection destination changer 172 changes the connection destination, which is to perform communication with the computer body 20, between the USB communications control circuit board 12 and the Ethernet communications control circuit board 13. The connection destination changer 172 changes the connection destination in accordance with an instruction from the touch controller 11.

The communication converter 171 converts the communication with the computer body 20 based on the USB communications standard into communication based on the Ethernet communications standard and relays the communication based on the Ethernet communications standard to the Ethernet communications control circuit board 13.

The touch controller 11 includes a setting processor 111, a touch input processing unit 112, and a connection destination change processing unit 113.

The connection destination change processing unit 113 outputs, to the connection destination changer 172, a change instruction to change the connection destination. Specifically, the connection destination change processing unit 113 outputs, to the connection destination changer 172, a change instruction to change the connection destination to the Ethernet communications control circuit board 13, before an OS category determination processing unit 161 classifies, as the first class, and determines the category of the OS 21. In other words, the connection destination change processing unit 113 outputs, to the connection destination changer 172, the change instruction to change the connection destination to the Ethernet communications control circuit board 13, before the OS category determination processing unit 161 performs the first determination process for classifying, as the first class, and determining the category of the OS 21 based on the TTL value. Consequently, the connection destination changer 172 connects the computer body 20 and the Ethernet communications control circuit board 13 to each other in a manner allowing communications before the OS category determination processing unit 161 classifies, as the first class, and determines the category of the OS 21.

If the computer body 20 and the Ethernet communications control circuit board 13 are connected to each other, the OS category determination processing unit 161 classifies, as the first class, and determines the category of the OS 21 based on the TTL value acquired from the Ethernet communications control circuit board 13 after the communication conversion from USB communication into Ethernet communication by the communication converter 171. As an example, the OS category determination processing unit 161, which has acquired a TTL value from the Ethernet communications control circuit board 13, refers to the OS category information D1 in FIG. 2 and determines a category of the OS 21 that corresponds to the TTL value.

If the TTL value is "62 to 64", the OS category determination processing unit 161 further classifies, as the second class, and determines the category of the OS 21 based on the communications parameter acquired from the USB communications control circuit board 12. Specifically, the connection destination change processing unit 113 outputs, to the connection destination changer 172, a change instruction to change the connection destination to the USB communications control circuit board 12, before the OS category determination processing unit 161 classifies, as the second class, and determines the category of the OS 21 after classifying, as the first class, and determining the category of the OS 21. In other words, the connection destination change processing unit 113 outputs, to the connection destination changer 172, the change instruction to change the connection destination to the USB communications control circuit board 12, before the OS category determination processing unit 161 performs the second determination process for classifying and determining the category of the OS 21 based on the communications parameter acquired from the USB communications control circuit board 12. Consequently, the connection destination changer 172 connects the computer body 20 and the USB communications control circuit board 12 to each other in a manner allowing communications before the OS category determination processing unit 161 classifies, as the second class, and determines the category of the OS 21.

If the computer body 20 and the USB communications control circuit board 12 are connected to each other, the OS category determination processing unit 161 classifies, as the second class, and determines the category of the OS 21 based on the control parameter ("Set Feature Report" and "Device Mode") acquired from the USB communications control circuit board 12 through the communications relay device 17.

Thus, the OS category determination processing unit 161 classifies, as the first class, and determines the category of the OS 21 based on the first communications parameter (TTL value) acquired from the Ethernet communications control circuit board 13 through the communications relay device 17 (the communication converter 171) (a first determination process) and then further classifies, as the second class, and determines the category of the OS 21 based on the second communications parameter ("Set Feature Report" and "Device Mode") acquired from the USB communications control circuit board 12 through the communications relay device 17 (a second determination process).

An output processing unit 162 outputs the result of determination by the OS category determination processing unit 161 to the touch controller 11. Specifically, the output processing unit 162 outputs the determined category of the OS 21 to the touch controller 11.

The touch controller 11 uses the data communications in accordance with the USB communications standard through the USB communications control circuit board 12 to control the operation of the touch panel 15 based on the OS 21 in the computer body 20. The touch controller 11 includes the setting processor 111 and the touch input processing unit 112.

The setting processor 111 sets up the operation mode of the touch panel 15. Specifically, the setting processor 111 sets an operation mode corresponding to the category of the OS 21, which has been determined by the OS category determination processing unit 161, as the operation mode of the touch panel 15.

Operation Control Processing

Figure 6:
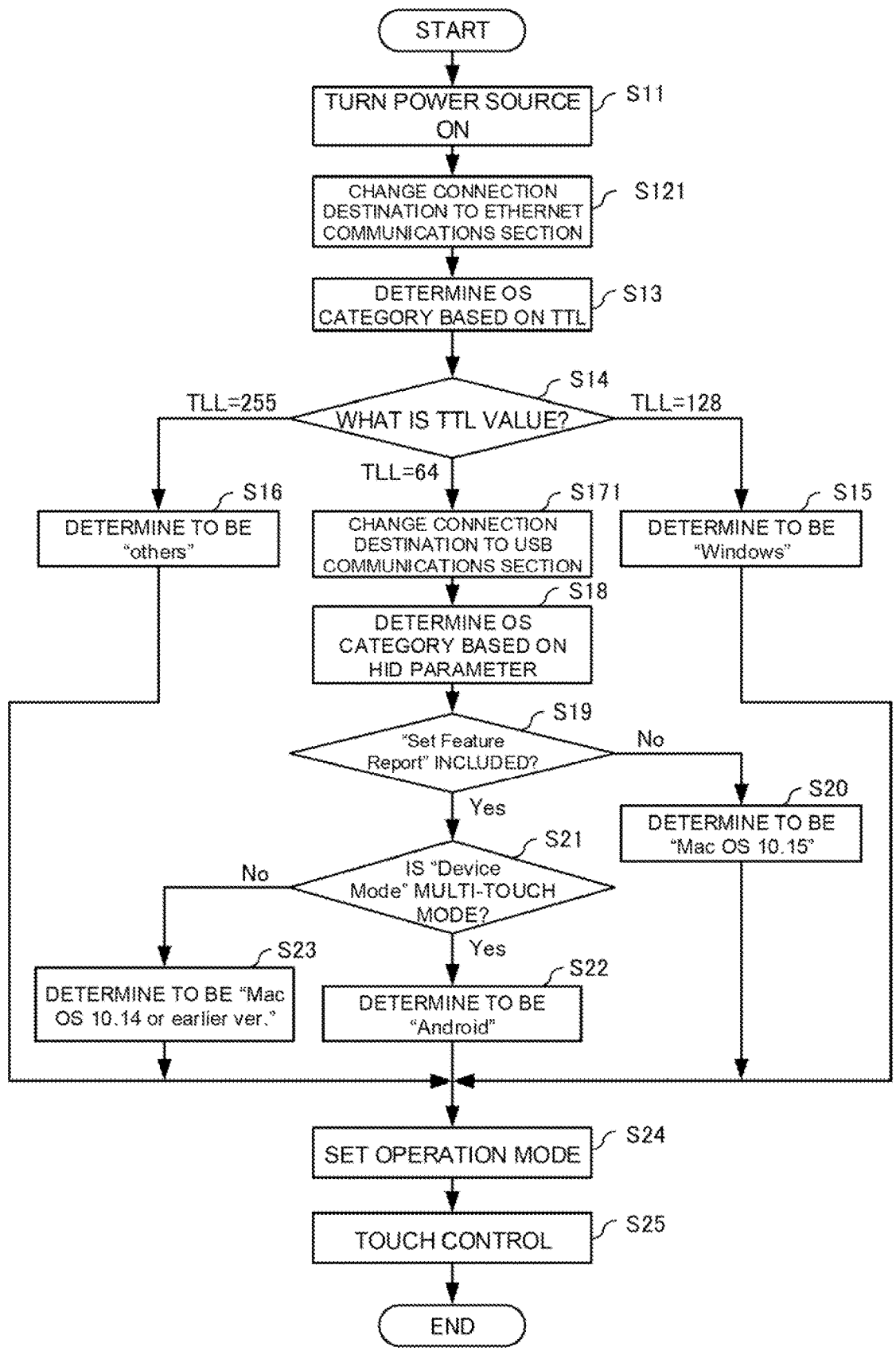
FIG. 6 is a flowchart illustrating an example of a procedure of operation control processing performed in the computer system according to Embodiment 2 of the present disclosure.

Referring to FIG. 6, operation control processing performed by the touch controller 11 and the control device 16 of the touch panel apparatus 10 according to Embodiment 2 is described below. In the following, the same processing steps as the processing steps of the operation control processing (see FIG. 4) according to Embodiment 1 are given the same reference signs and description on such steps is omitted.

If a power source of the computer system 1 is initially turned on (step S11), the controller (the connection destination change processing unit 113) outputs, to the connection destination changer 172, the change instruction to change the connection destination, which is to perform communication with the computer body 20, to the Ethernet communications control circuit board 13 (step S121). In other words, the controller outputs, to the connection destination changer 172, the change instruction to change the connection destination to the Ethernet communications control circuit board 13, before performing the first determination process for classifying and determining the category of the OS 21 based on the TTL value. As a result, the connection destination changer 172 connects the computer body 20 and the Ethernet communications control circuit board 13 to each other in a manner allowing communications.

Next in step S13, the controller (the OS category determination processing unit 161) determines the category of the OS 21 installed in the computer body 20. Specifically, the controller performs the first determination process for classifying, as the first class, and determining the category of the OS 21 based on the TTL value acquired from the Ethernet communications control circuit board 13 through the communication converter 171. For instance, the controller acquires a TTL value from the Ethernet communications control circuit board 13, refers to the OS category information D1 in FIG. 2, and determines a category of the OS 21 that corresponds to the TTL value.

If the TTL value is "62 to 64", the controller determines that the OS 21 is "Linux/Mac/Android", that is to say, is Linux, Mac or Android, and the processing proceeds to step S171.

In step S171, the controller outputs, to the connection destination changer 172, the change instruction to change the connection destination, which is to perform communication with the computer body 20, to the USB communications control circuit board 12. In other words, the controller outputs, to the connection destination changer 172, the change instruction to change the connection destination to the USB communications control circuit board 12, before performing the second determination process for classifying and determining the category of the OS 21 based on the communications parameter acquired from the USB communications control circuit board 12. As a result, the connection destination changer 172 connects the computer body 20 and the USB communications control circuit board 12 to each other in a manner allowing communications.

Next in step S18, the controller (the OS category determination processing unit 161) performs the second determination process for classifying and determining the category of the OS 21 based on the communications parameter acquired from the USB communications control circuit board 12 through the communications relay device 17. For instance, the controller determines whether the OS 21 is "Mac" or "Android", based on "Set Feature Report" and "Device Mode" as the control parameter for controlling the operation mode of the touch panel 15. The processing after step S18 is the same as the operation control processing (see FIG. 4) according to Embodiment 1.

As described above, the touch panel apparatus 10 according to Embodiment 2 is connected to the computer body 20, in which a specified OS is installed, and thereby performs communication and exerts the function to detect a touch input. The touch panel apparatus 10 includes the Ethernet communications control circuit board 13, which performs communication with the computer body 20 based on the Ethernet communications standard, and the USB communications control circuit board 12, which performs communication with the computer body 20 based on the USB communications standard. The touch panel apparatus 10 changes the connection destination, which is to perform communication with the computer body 20, between the Ethernet communications control circuit board 13 and the USB communications control circuit board 12. To be specific: The touch panel apparatus 10 connects the computer body 20 and the Ethernet communications control circuit board 13 to each other, classifies and determines the category of the OS 21 based on the first communications parameter (TTL value) acquired from the Ethernet communications control circuit board 13, and sets an operation mode corresponding to the determined category of the OS 21. In addition, the touch panel apparatus 10 connects the computer body 20 and the USB communications control circuit board 12 to each other, classifies and determines the category of the OS 21 based on the second communications parameter ("Set Feature Report" and "Device Mode") acquired from the USB communications control circuit board 12, and sets an operation mode corresponding to the determined category of the OS 21. The touch panel apparatus 10 performs the process for detecting a touch input according to the set operation mode, based on the communication with the computer body 20 performed by the USB communications control circuit board 12.

Thus, the touch panel apparatus 10 changes the connection destination, which is to perform communication with the computer body 20, between the Ethernet communications control circuit board 13 and the USB communications control circuit board 12 and uses different communications parameters (the TTL value and the control parameter ("Set Feature Report" and "Device Mode")) to perform the determination processes (the first determination process and the second determination process) for determining the category of the OS 21 in the computer body 20. The configuration as above makes it possible to easily set, in the touch panel apparatus 10 connected to the computer body 20 for use, an operation mode corresponding to the function of the touch panel apparatus 10, which corresponds to the OS 21 in the computer body 20. As a result, a user does not need to personally set an operation mode corresponding to an available function on the touch panel apparatus 10, so that the convenience is improved.

Modifications

Figure 7:
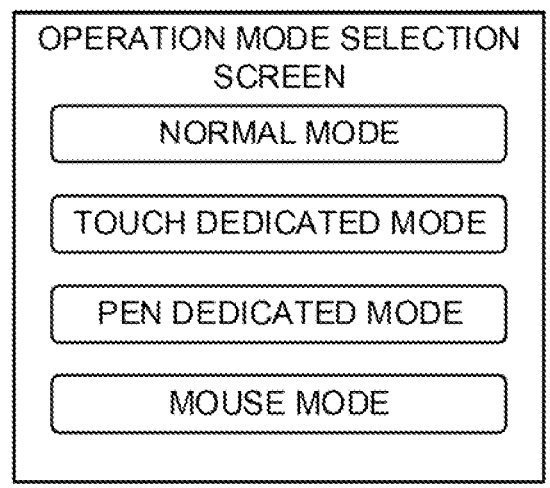
FIG. 7 is a diagram illustrating an example of an operation mode selection screen displayed in a computer system according to an embodiment of the present disclosure.

The present disclosure is not limited to the embodiments as described above. The touch panel apparatus 10 in each of Embodiments 1 and 2 may have a configuration further allowing acceptance of an operation to select the operation mode that is performed by a user. In that case, the touch panel apparatus 10 displays such a selection screen for selecting the operation mode as illustrated in FIG. 7 on the display panel so as to accept a selection operation performed by a user. The touch panel apparatus 10 sets the operation mode of the touch panel 15 to the operation mode as selected by the user.

The touch panel apparatus 10 may only cause an operation mode corresponding to the OS 21 in the computer body 20 to be selectably displayed in the selection screen. If the category of the OS 21 as determined by the OS category determination processing unit 161 is "Windows", the touch input processing unit 112 can detect the touch input with a finger of a user and the touch input with a touch pen. In such case, the touch panel apparatus 10 causes the "normal mode", the "touch dedicated mode", the "pen dedicated mode", and the "mouse mode" to be selectably displayed in the selection screen.

If the category of the OS 21 as determined by the OS category determination processing unit 161 is "Mac", the touch input processing unit 112 can detect the touch input with a touch pen and the input through the operation of a mouse by a user. In such case, the touch panel apparatus 10 only causes the "pen dedicated mode" and the "mouse mode" to be selectably displayed in the selection screen.

Apart from the embodiments as described above, various modifications are possible about the present disclosure. Such modifications should not be construed to fall outside the scope of the present disclosure. In the present disclosure, modifications equivalent in signification to the claims and modifications within the above scope are all to be incorporated.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An electronic apparatus connectable to a computer body, in which a specified operating system is installed, and usable for communications and exertion of a specified function, the electronic apparatus comprising:
   a first communicator that performs communication with the computer body based on a first communications standard;
   a second communicator that performs communication with the computer body based on a second communications standard;
   a determination processor that classifies and determines a category of the specified operating system based on a first communications parameter acquired from the first communicator;
   a setting processor that sets an operation mode corresponding to the category of the specified operating system as determined by the determination processor; and
   a controller that controls, based on the communication with the computer body performed by the second communicator, the specified function according to the operation mode set by the setting processor.

2. The electronic apparatus according to claim 1, further comprising a communications relay device that converts communication with the computer body based on the second communications standard into communication based on the first communications standard and relays the communication based on the first communications standard to the first communicator.

3. The electronic apparatus according to claim 1, further comprising a connection destination changer that changes a connection destination, which is to perform communication with the computer body, between the first communicator and the second communicator,
   wherein the connection destination changer changes the connection destination to the first communicator before the determination processor classifies, as a first class, and determines the category of the specified operating system, and changes the connection destination to the second communicator before the determination processor classifies, as a second class, and determines the category of the specified operating system after classifying, as the first class, and determining the category of the specified operating system.

4. The electronic apparatus according to claim 1, wherein the determination processor classifies, as a first class, and determines the category of the specified operating system based on the first communications parameter acquired from the first communicator and then further classifies, as a second class, and determines the category of the specified operating system based on a second communications parameter acquired from the second communicator.

5. The electronic apparatus according to claim 1, wherein the first communications parameter is a value of time to live (TTL).

6. The electronic apparatus according to claim 1, wherein the first communications standard is an Ethernet standard.

7. The electronic apparatus according to claim 1, wherein the first communications standard employs a transmission control protocol/internet protocol (TCP/IP protocol).

8. The electronic apparatus according to claim 4, wherein the second communications parameter includes a Set Feature Report parameter and a Device Mode parameter.

9. The electronic apparatus according to claim 1, wherein the second communications standard is a universal serial bus (USB) standard.

10. The electronic apparatus according to claim 1, wherein the second communications standard employs a human interface device (HID) protocol.

11. The electronic apparatus according to claim 1,
    wherein the electronic apparatus is a touch panel apparatus, and
    wherein the operation mode includes at least two operation modes among a first operation mode, in which an input with a touch pen is detectable, a second operation mode, in which an input with a finger is detectable, and a third operation mode, in which the input with a touch pen and the input with a finger are detectable.

12. A control method for an electronic apparatus connectable to a computer body, in which a specified operating system is installed, and usable for communications and exertion of a specified function, which apparatus includes a first communicator that performs communication with the computer body based on a first communications standard and a second communicator that performs communication with the computer body based on a second communications standard, the control method comprising using one or more processors to implement:

determining to classify and determine a category of the specified operating system based on a first communications parameter acquired from the first communicator;

setting to set an operation mode corresponding to the category of the specified operating system as determined by the determining; and controlling to control, based on the communication with the computer body performed by the second communicator, the specified function according to the operation mode set by the setting.

13. A non-transitory computer readable recording medium, on which a program for controlling an electronic apparatus connectable to a computer body, in which a specified operating system is installed, and usable for communications and exertion of a specified function, which apparatus includes a first communicator that performs communication with the computer body based on a first communications standard and a second communicator that performs communication with the computer body based on a second communications standard, is recorded, the program causing one or more processors to implement:

a determination step to classify and determine a category of the specified operating system based on a first communications parameter acquired from the first communicator;

a setting step to set an operation mode corresponding to the category of the specified operating system as determined by the determination step; and a control step to control, based on the communication with the computer body performed by the second communicator, the specified function according to the operation mode set by the setting step.

\* \* \* \* \*